United States Patent
Wistorf et al.

(10) Patent No.: US 10,782,386 B2
(45) Date of Patent: Sep. 22, 2020

(54) METHOD, COMPUTER-READABLE MEDIUM, AND SYSTEM FOR GENERATING REFERENCE DATA FOR DETERMINING A POSITION OF OBJECTS RELATIVE TO A VEHICLE

(71) Applicant: Bayerische Motoren Werke Aktiengesellschaft, Munich (DE)

(72) Inventors: Ralf Wistorf, Munich (DE); Stefan Heinbockel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 15/848,065

(22) Filed: Dec. 20, 2017

(65) Prior Publication Data

US 2018/0113190 A1    Apr. 26, 2018

Related U.S. Application Data

(63) Continuation of application No. PCT/EP2016/060283, filed on May 9, 2016.

(30) Foreign Application Priority Data

Jun. 25, 2015   (DE) ........................ 10 2015 211 833

(51) Int. Cl.
*G01S 5/02*       (2010.01)
*H04W 4/02*       (2018.01)
*H04W 4/40*       (2018.01)

(52) U.S. Cl.
CPC ........... *G01S 5/0252* (2013.01); *H04W 4/023* (2013.01); *H04W 4/40* (2018.02)

(58) Field of Classification Search
CPC .... H04W 4/02–046; H04W 64/00–006; G01S 5/00–30
(Continued)

(56) References Cited

U.S. PATENT DOCUMENTS

| 7,506,540 B1 | 3/2009 | Job |
| 2007/0139269 A1 | 6/2007 | Chen et al. |

(Continued)

FOREIGN PATENT DOCUMENTS

| DE | 10 2009 009 627 A1 | 10/2009 |
| DE | 10 2012 204 673 A1 | 9/2012 |

(Continued)

OTHER PUBLICATIONS

Lemelson, H. et al., "Improvements for 802.11-based Location Fingerprinting Systems", 2009 $33^{rd}$ Annual IEEE International Computer Software and Applications Conference, Jul. 20, 2009, pp. 21-28.

(Continued)

*Primary Examiner* — Allahyar Kasraian
(74) *Attorney, Agent, or Firm* — Crowell & Moring LLP

(57) ABSTRACT

A method is provided for generating reference data for determining a position of objects relative to a vehicle. The method includes: determining a measured value of a radio signal for each position of an object from a predetermined number of positions of the object in at least two spatial zones of the vehicle; determining focal points for the determined measured values in each spatial zone of the vehicle, wherein each focal point represents a group of determined measured values in one of the defined spatial zones of the vehicle; and storing the focal points as reference data for determination of the position of objects in the vehicle.

12 Claims, 4 Drawing Sheets

(58) Field of Classification Search
USPC .............................................. 455/456.1–457
See application file for complete search history.

(56) References Cited

U.S. PATENT DOCUMENTS

| | | |
|---|---|---|
| 2012/0133498 A1 | 5/2012 | Nah et al. |
| 2012/0244877 A1 | 9/2012 | Margalef et al. |
| 2013/0143594 A1* | 6/2013 | Ghabra ................. H04W 24/00 455/456.1 |
| 2014/0184396 A1 | 7/2014 | Ott et al. |
| 2014/0222954 A1* | 8/2014 | Vaccari ................. H04W 4/029 709/217 |
| 2014/0306814 A1* | 10/2014 | Ricci ....................... H04W 4/21 340/425.5 |
| 2017/0276761 A1* | 9/2017 | Park .......................... G01S 5/02 |

FOREIGN PATENT DOCUMENTS

| | | |
|---|---|---|
| DE | 10 2011 103 674 B3 | 12/2012 |
| DE | 11 2010 003 247 T5 | 4/2013 |
| WO | WO 2014/155255 A1 | 10/2014 |

OTHER PUBLICATIONS

German-language Office Action issued in counterpart German Application No. 10 2015 211 833.9 dated Dec. 21, 2015 (four (4) pages).
International Search Report (PCT/ISA/210) issued in PCT Application No. PCT/EP2016/060283 dated Aug. 5, 2016 with English-language translation (eight (8) pages).

* cited by examiner

METHOD, COMPUTER-READABLE MEDIUM, AND SYSTEM FOR GENERATING REFERENCE DATA FOR DETERMINING A POSITION OF OBJECTS RELATIVE TO A VEHICLE

CROSS REFERENCE TO RELATED APPLICATIONS

This application is a continuation of PCT International Application No. PCT/EP2016/060283, filed May 9, 2016, which claims priority under 35 U.S.C. § 119 from German Patent Application No. 10 2015 211 833.9, filed Jun. 25, 2015, the entire disclosures of which are herein expressly incorporated by reference.

BACKGROUND AND SUMMARY OF THE INVENTION

The invention relates to a method for generating reference data for determining a position of objects relative to a vehicle.

Vehicle access systems, for example access identification devices, can determine a position of objects relative to a vehicle. For this purpose, a predefined number of communication antennas can be installed in the vehicle and can communicate with the objects. The communication can take place via radio signals from the communication antennas. In this case, properties of the radio signals can be measured in order to determine the position of an object. The properties of the radio signals may differ depending on the vehicle type, with the result that the vehicle access systems must be specifically adapted for each vehicle and/or each vehicle type.

Therefore, an object of the invention is to improve upon the determination of a position of objects relative to a vehicle. In particular, an object of the invention is to improve the adaptation of the determination of the position of objects relative to the vehicle with respect to different vehicles and/or vehicle types.

This and other objects are achieved by a method, a system and a computer-readable medium, for generating reference data for determining a position of objects relative to a vehicle, in accordance with embodiments of the invention.

A first aspect of the invention describes a method for generating reference data for determining a position of objects relative to a vehicle. The method includes determining a measured value of a radio signal for each position of an object from a predefined number of positions of the object in at least two spatial zones of the vehicle. An object may be an identification device, for example a mobile telephone, a vehicle key, an access identification device, a charging apparatus and/or a sensor system. The method also includes determining focal points for the determined measured values in each spatial zone of the vehicle, wherein each focal point represents a group of determined measured values in one of the predefined spatial zones of the vehicle. The method also comprises storing the focal points as reference data for determining the position of objects in the vehicle. A focal point may be a measured value which is calculated from the determined measured values and represents a group of measured values which are in the vicinity of the focal point. A focal point may divide a spatial zone into sub-regions or clusters. In this case, a focal point may be characteristic of measured values in a sub-region or a cluster of a spatial zone. Determining and storing focal points for determined measured values makes it possible to efficiently determine reference data for determining a position of objects relative to a vehicle.

According to one advantageous configuration, each focal point can be determined in such a manner that a distance between the determined measured values and a focal point is as short as possible. Using a distance measure makes it possible to simplify the determination of a focal point.

According to another advantageous configuration, a number of focal points in one of the predefined spatial zones can be stipulated on the basis of a predefined success rate for determining the predefined spatial zones, wherein the number of focal points may be smaller than the number of determined measured values in one of the predefined spatial zones. This makes it possible to dynamically adapt the number of focal points, with the result that the reference data have a minimum quality.

According to another advantageous configuration, the method may also include generating a test set from the determined measured values, selecting a measured value from the test set, calculating a position of the selected measured value relative to one or more stored focal points, determining a spatial zone belonging to the calculated position of the selected measured value, verifying the determined spatial zone of the selected measured value, and updating the success rate for determining the predefined spatial zones. This makes it possible to efficiently and automatically verify and/or validate the focal points.

According to another advantageous configuration, the method may also include changing the number of focal points, calculating the changed number of focal points for the determined measured values in each spatial zone of the vehicle, selecting a measured value from the test set, calculating a position of the selected measured value relative to one or more stored focal points, determining a spatial zone belonging to the calculated position of the selected measured value, verifying the determined spatial zone of the selected measured value, and updating the success rate for determining the predefined spatial zones if the success rate for determining the predefined spatial zones undershoots a predefined threshold value. In other words: the number of focal points can be changed in order to achieve a minimum quality for the reference data and, in particular, for determining the position by means of the reference data. This makes it possible to efficiently improve the reference data.

According to another advantageous configuration, the method may include storing the focal points as reference data for determining the position of objects relative to the vehicle in the vehicle if the success rate for determining the predefined spatial zones exceeds the predefined threshold value. This makes it possible to ensure that the reference data are stored in the vehicle if a minimum quality is reached or exceeded.

According to another advantageous configuration, the received measured values may be subjected to preprocessing before the focal points are determined. The preprocessing may take into account physical effects of the radio signal. For example, the cube root may be calculated for each measured value in order to attenuate the effect of a magnetic field decreasing with the third power. This makes it possible to efficiently filter physical effects of the radio signal in order to make it possible to calculate the focal points in a more precise manner and therefore to calculate the reference data in a more precise manner.

According to another advantageous configuration, the determined measured values and/or the positions of the object can be given a higher weighting in a border region between at least two spatial zones than the determined measured values outside the border region. For example, the weighted measured values and/or positions of the object can be used to enable a weighted calculation of the success rate. Successful or unsuccessful determination of the correct zone of a weighted measured value and/or of a weighted position of the object during verification of the zone can therefore more strongly influence the success rate. This makes it possible to verify the border region of the spatial zones in an improved manner.

A further aspect of the invention describes a non-transitory computer-readable medium for generating reference data for determining a position of objects relative to a vehicle, wherein the computer-readable medium has instructions which, when executed on a computer, carry out the method described above.

A further aspect describes a system for generating reference data for determining a position of objects relative to a vehicle, wherein the system is designed to carry out the method described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
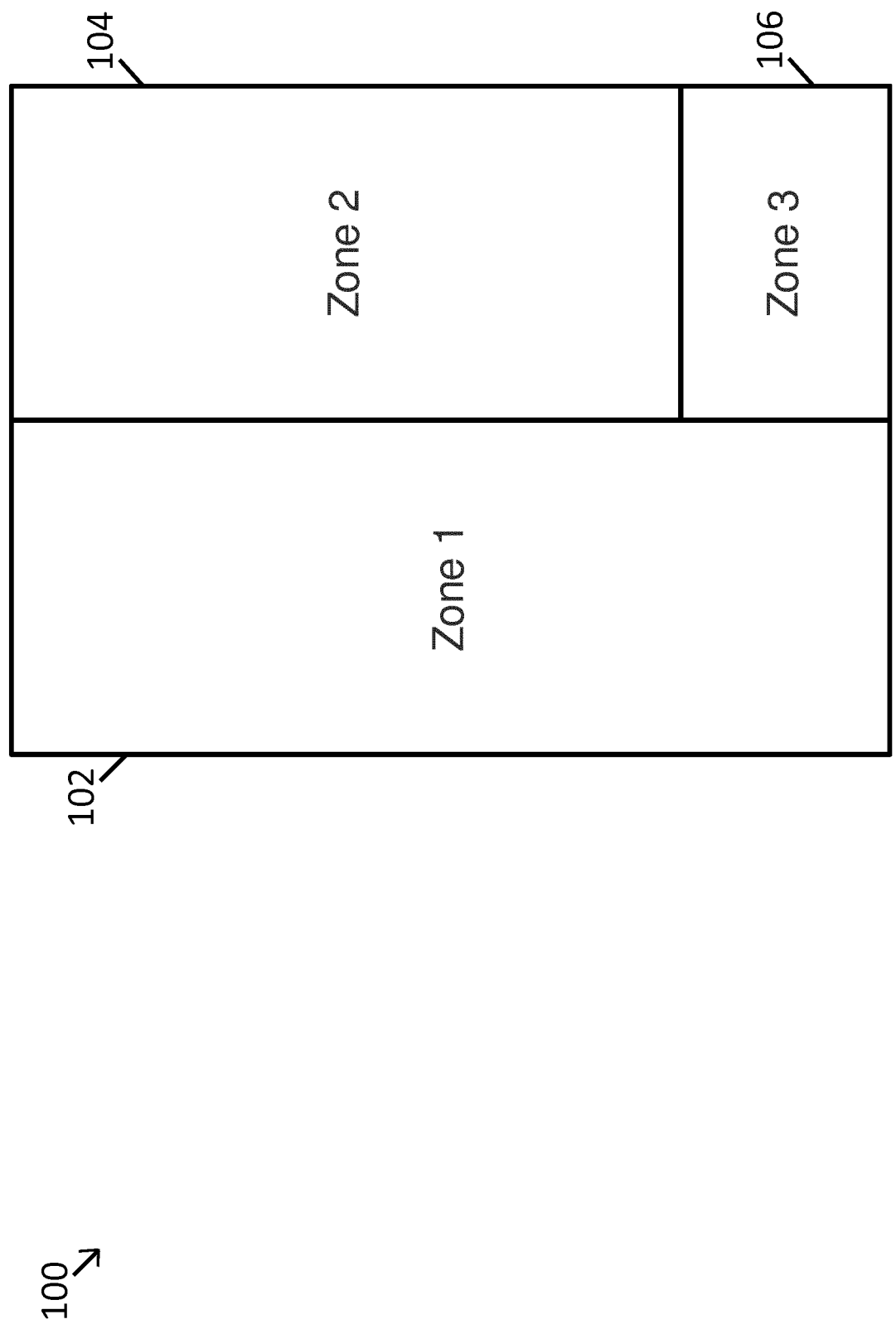
FIG. 1 schematically shows an exemplary division of a region in and around a vehicle into spatial zones.

In detail, FIG. 1 shows an exemplary division 100 of a region in and around a vehicle into spatial zones. A spatial zone may specify a region inside the vehicle and/or outside the vehicle. The term "spatial zone" and the term "zone" are used synonymously in the present document. A spatial zone 102 may correspond to a region along one or more doors, for example the driver's door, of the vehicle. A further spatial zone 104 may correspond to an interior of the vehicle. A spatial zone 106 may also represent a trunk of the vehicle. The region in and around the vehicle can preferably be divided into at least two zones. For example, the region in and around the vehicle can be subdivided into 2, 3, 4, 5, 6, 7, 8, 9 or 10 zones. With the increase in the number of zones, an object can be allocated more accurately to a region in and/or around the vehicle.

The number of zones can be arbitrarily selected, that is to say may comprise more than 10 zones. The number and size of the zones which can be distinguished by a vehicle may be variable and may be adapted to different applications. Possible applications may be the determination of a position of an object relative to a vehicle. For this purpose, the object may be moving or may be stationary and/or the vehicle may be stationary or may be moving. For example, the object may be stationary and the vehicle may be moved relative to the stationary object. For example, the object may be moved and the vehicle may be stationary. For example, the object may be moving and the vehicle may be moving. In each scenario, the position of the object relative to the vehicle can be determined in order to determine the object in one of the spatial zones.

Spatial zones may also have borders with respect to further spatial zones. As shown in FIG. 1, the spatial zone 102 may have a border with respect to the spatial zone 104 and with respect to the spatial zone 106. The spatial zone 104 may have a border with respect to the spatial zones 102 and 106. And the spatial zone 106 may have a border with respect to the spatial zones 102 and 104. Stipulating the zones 102, 104 and 106 and the borders between the zones makes it possible to determine objects in the zones 102, 104 and/or 106. If the object is an access identification device, for example, the zone in which the access identification device is situated can be determined. If the access identification device is situated in zone 1, for example, which can correspond to a region on the driver's side of the vehicle, the vehicle can detect that the access identification device is in the vicinity of the vehicle and can carry out corresponding actions, for example the unlocking of the driver's door of the vehicle.

Figure 2:
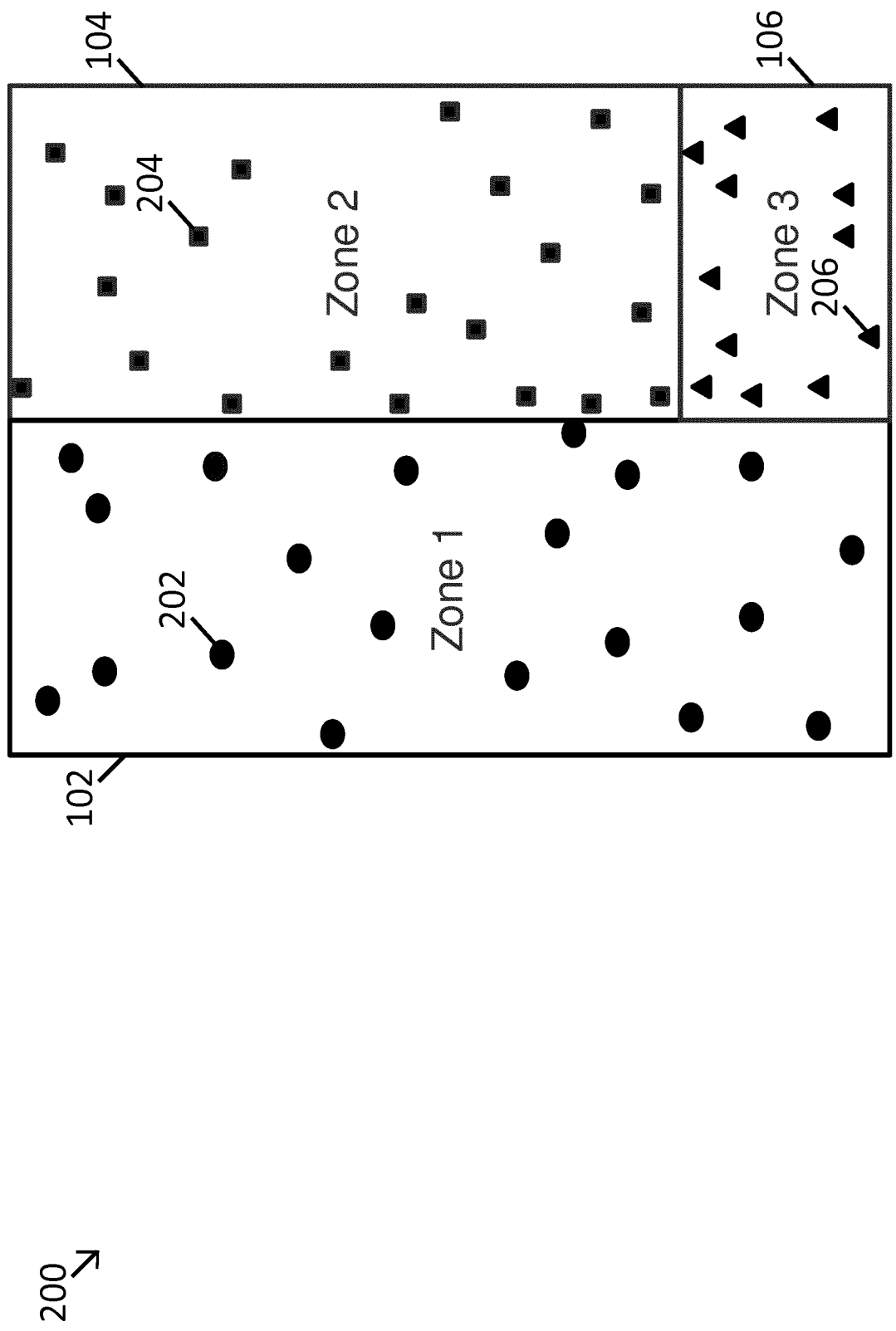
FIG. 2 schematically shows exemplary measured value recording inside the spatial zones.

FIG. 2 shows exemplary measured value recording 200 inside the spatial zones 102, 104 and 106 of the vehicle. In order to record or determine a measured value, an object can be positioned at a position inside a zone. The object can receive one or more radio signals from the vehicle at the position of the object. The radio signals can be transmitted by antennas, in particular communication antennas, which are integrated in the vehicle. The radio signals can preferably be sequentially received from the antennas of the vehicle. For each received radio signal, the object can determine one or more measured values of one or more features of the radio signal. The measured values of the radio signal may include the features of the field strength, direction of the radio signal and/or the phase angle of the radio signals with respect to one another. Measured values of features of a plurality of radio signals at a position of the object can be combined to form feature vectors. In other words: the feature vector can define the position of the object using the measured values of the received radio signals.

As shown in FIG. 2, measured values or feature vectors of measured values can be determined for a number of positions of the object inside the respective zones 102, 104 and/or 106. A measured value or a feature vector of measured values can be assigned to a particular zone. When determining the measured value, the zone in which the measured value was determined is known. The zone can be linked to the determined measured value and/or the determined feature vector of measured values. In FIG. 2, the measured value 202 is linked to the zone 102, the measured value 204 is linked to the zone 104 and the measured value 206 is linked to the zone 106, for example. Linking a measured value or a feature vector of measured values to a zone makes it possible to ensure that a measured value or a feature vector of measured values is correctly assigned.

The maximum number of positions of the objects in a zone is preferably predefined. The maximum number of positions of the objects can be arbitrarily selected in this case. For example, it is possible to stipulate that measured values or feature vectors of measured values are determined at a maximum of 200 positions of the object in each zone. The positions of the object for recording or determining the measured values at these positions can be freely selected in the respective zones. The positions of the object can preferably be randomly selected in the region of a zone. The object can be positioned at each of the randomly selected positions and the measured values of the received radio signals can be determined. Additionally or alternatively, positions can be selected cumulatively at particular locations of a zone. For example, positions of the object at which the measured values are determined can be cumulatively determined at a border between two zones or at particular locations inside a zone. The positions of the object inside the associated spatial zone can be determined in an automated manner. Furthermore, a position of the object at which measured values of the radio signals are intended to be determined can be additionally or alternatively defined manually.

The object can store the determined measured values or feature vectors of measured values at the selected positions. Alternatively, the object can transmit the determined measured values to a computer and/or a control device of the vehicle via a wireless or wired communication interface. The computer and/or the control device can receive and/or process the received measured values or feature vectors of measured values. In particular, the computer and/or the control device can calculate focal points of the determined measured values or feature vectors of measured values, as explained in more detail on the basis of FIG. 3.

In addition, the determined measured values of the radio signals can be preprocessed before determining the focal points. The preprocessing can take into account physical effects of the radio signal. For example, the cube root can be calculated for each measured value in order to attenuate the effect of a magnetic field decreasing with the third power. This makes it possible to efficiently filter physical effects of the radio signal in order to make it possible to calculate the focal points in a more precise manner and therefore to calculate the reference data in a more precise manner.

The measured values can be recorded or determined for each spatial zone. The measured values can be linked to the spatial zone in which the measured values were determined. The measured values and the associated spatial zone can be stored. Linking the zone to the measured values at the position of the object makes it possible to correctly determine the zone in which the measured values were determined. Measured values can be newly recorded or determined for each vehicle or each vehicle type. After the measured values have been recorded or determined at the positions of the object, the reference data can be calculated. The reference data can be calculated in an automated manner, with the result that it is possible to easily adapt the reference data to different vehicles and/or vehicle types.

Additionally or alternatively, a test set can be generated from the set of determined measured values or feature vectors of measured values in each spatial zone. The test set may comprise a randomly selected number of determined measured values or feature vectors and the associated spatial zone. The number of measured values or feature vectors may be variable and may be dynamically changed or configured. The test set can be used to automatically verify the determination of the position of objects. In particular, the test set can be used to verify reference data or a reference data record.

Figure 3:
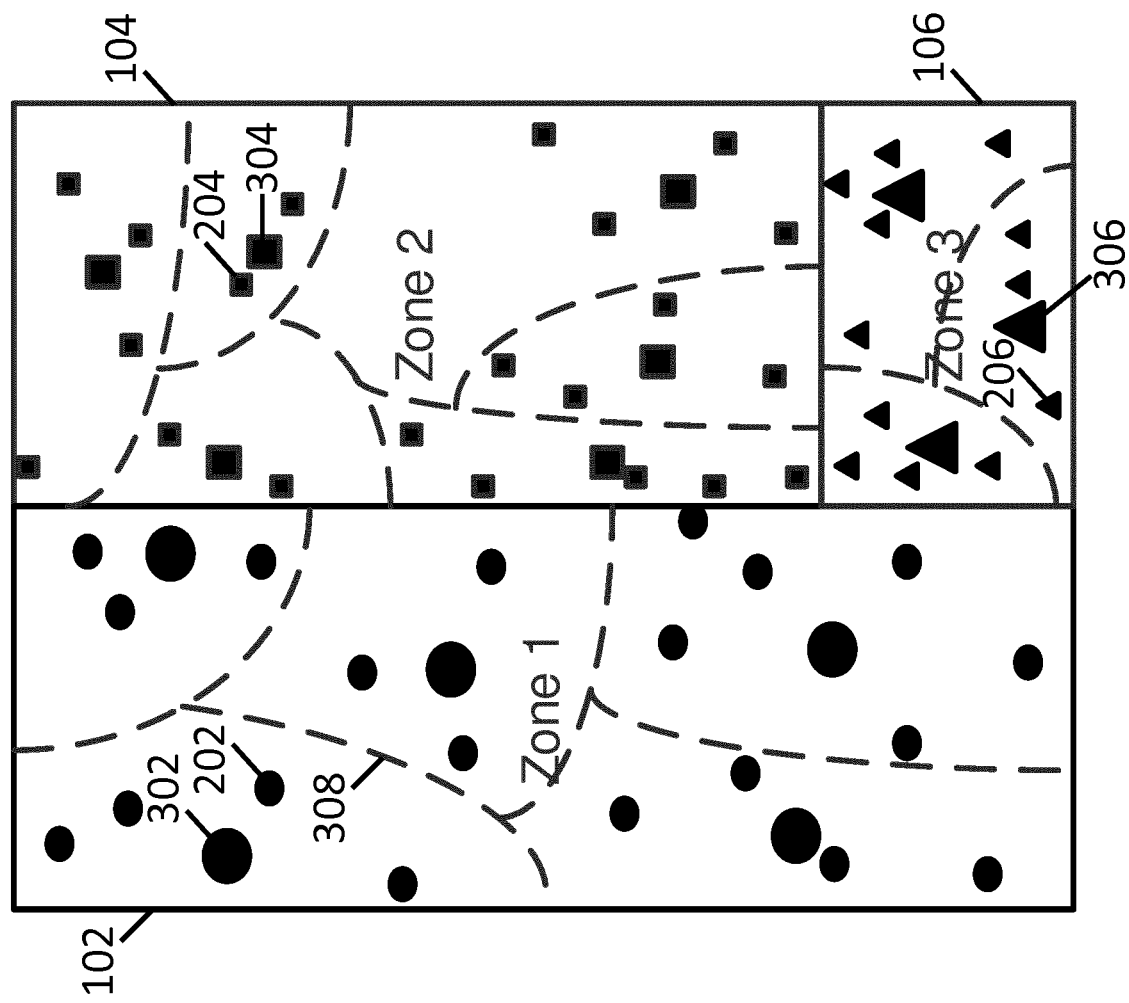
FIG. 3 schematically shows exemplary determination of focal points for groups of measured values inside the spatial zones.

FIG. 3 shows exemplary determination or calculation 300 of focal points for groups of measured values inside the zones 102, 104 and/or 106. A focal point may include one or more measured values. A focal point is preferably a feature vector of measured values. A focal point may represent a group of measured values or feature vectors of measured values determined in the vicinity of the focal point. In other words: a focal point may be characteristic of a sub-region of a zone. As shown in FIG. 3, a focal point 302 can be calculated for four of the measured values 202 or feature vectors of measured values in the vicinity. A dashed line 308 shows, by way of example, that the focal point 302 is characteristic of that sub-region of the spatial zone 102 which is indicated by the dashed line. In other words: the focal point may be a feature vector which comprises measured values of radio signals which are calculated from the determined measured values of the radio signals in the vicinity of the position of the focal point. The calculated focal points represent the reference data or the reference data record for determining the position of objects. The focal points can be automatically recalculated for each vehicle or each vehicle type, with the result that the determination of the position of objects is efficiently adapted to the respective vehicle or the respective vehicle type.

In detail, the focal points can be calculated or determined on the basis of the determined measured values or feature vectors of measured values. The focal points and the number of focal points can be determined in an automated manner. The number of focal points inside a spatial zone is intended to be as small as possible and/or is intended to describe the spatial zone as accurately as possible. The number of focal points can be arbitrarily selected for each spatial zone. For example, the number of focal points of a zone may comprise 200 focal points. The number of focal points may be smaller than the number of determined measured values. A k-means method, for example, can be used to determine the focal points. The k-means method can select a predefined number of focal points in such a manner that a distance between the determined measured values or feature vectors and a focal point is as short as possible. In this case, the distance may be a Euclidean distance or a Manhattan distance, for example.

The determined focal points can be verified using the test set. For this purpose, a measured value or a feature vector of measured values can be selected from the test set and the associated spatial zone can be determined. The associated spatial zone can preferably be determined for each measured value or feature vector of measured values. The spatial zone can be determined as described in FIG. 4. If a zone has been correctly determined, a parameter representing a number of successfully assigned zones can be incremented. A success rate can be calculated from the ratio of the successfully assigned zones to the total number of determined zones. The success rate may be an indicator of the quality of the determined focal points and therefore a quality for the reference data for determining the position of objects. If the success rate exceeds a predefined threshold value, the determined focal points can be stored as reference data or as a reference data record in a control device of the vehicle. In other words: the determined focal points have been successfully verified by means of the test set.

If the success rate does not exceed the predefined threshold value, the focal points can be determined again. The number of focal points, for example, can be changed for recalculating the focal points. For example, it is possible to increase the number of focal points in the spatial zone in which the zone was incorrectly determined during verification. Furthermore, the number of measured values or feature vectors in the test set can be changed. After changing the number of focal points and/or the test set, the focal points can be determined again, as described above, and can be verified using the test set. The determination of the focal points and the verification using the test set can be carried out until the success rate exceeds the predefined threshold value. If the success rate exceeds a predefined threshold value, the determined focal points can be stored as reference data or as a reference data record in a control device of the vehicle. The determined measured values or feature vectors of measured values can be used to recalculate the focal points.

Figure 4:
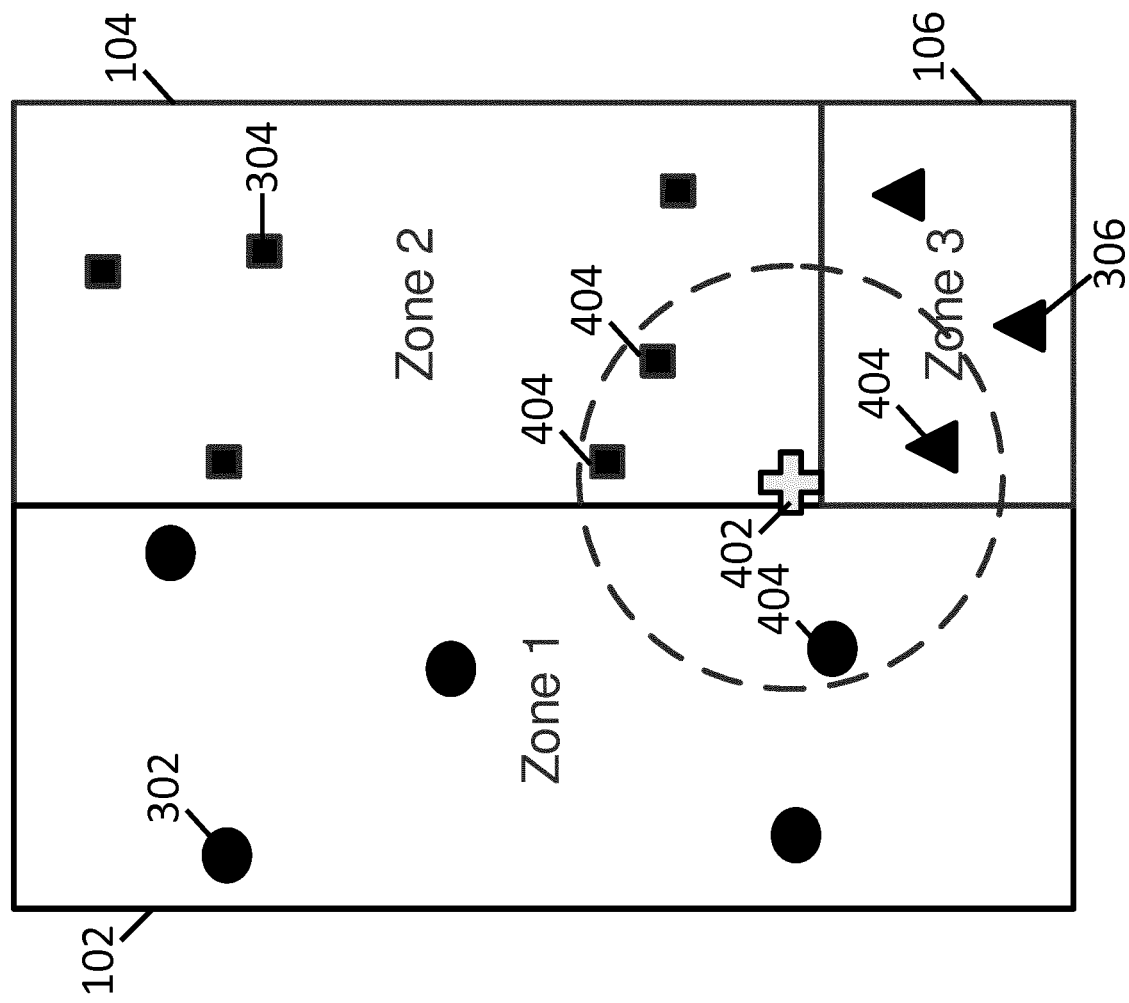
FIG. 4 schematically shows an example of the determination of a position of an object relative to a vehicle by use of focal points.

FIG. 4 shows an example of the determination 400 of a position of an object relative to a vehicle using focal points. The object may be a measured value or a feature vector of measured values from the test set. The object may also be a device, in particular an identification device, which receives one or more radio signals from the vehicle, determines one or more measured values of the radio signals and transmits them to the vehicle at each position of the object. The received measured values can preferably be subjected to preprocessing. The preprocessing can take into account physical effects of the radio signal. For example, the cube root can be calculated for each measured value in order to attenuate the effect of a magnetic field decreasing with the third power. This makes it possible to efficiently filter physical effects of the radio signal in order to make it possible to determine a feature vector in a more precise manner on the basis of the measured values and therefore to determine the position of the object in a more precise manner. The preprocessing of the measured values may be the same when determining the focal points or the reference data and when determining the position of an object, that is to say the same function for processing the measured values is applied to the determined measured values. The vehicle or the control device of the vehicle can use the transmitted measured values to generate a feature vector which includes the determined measured values for a position of the object. The generation of the feature vector may comprise, for example, adding a determined measured value for each received radio signal from a communication antenna of the vehicle to a vector at a position of the object. As shown in FIG. 4, the object is at position 402. The position of the object in the spatial zone 104 is close to the borders with respect to the spatial zones 102 and 106.

In order to determine the position of the object, it is possible to determine a distance, for example a Euclidean distance or a Manhattan distance, between the generated feature vector and known feature vectors, that is to say the focal points determined above, of the reference data. In detail, a predefined number of known feature vectors in the vicinity of the generated feature vector can be determined. For this purpose, the distance between the generated feature vector and each of the known feature vectors is calculated and the known feature vectors are sorted on the basis of the calculated distance to the generated feature vector. The predefined number of known feature vectors which are at the shortest distance from the generated feature vector can then be selected. The selected feature vectors are the feature vectors in the vicinity of the generated feature vector, that is to say in the vicinity of the position of the object. In the example in FIG. 4, four known feature vectors or focal points 404 are in the vicinity of the position 402 of the object.

The selected feature vectors are used to determine the spatial zone of the generated feature vector. For this purpose, the spatial zone which is most frequently linked to the selected feature vectors is determined. The spatial zone which is most frequently linked to the selected feature vectors is the spatial zone of the generated feature vector. In other words: the spatial zone of the object is the spatial zone which is determined by a majority decision among the spatial zones which are linked to the selected feature vectors. As shown in FIG. 4, a selected feature vector or focal point is situated in the spatial zones 102 and 106, whereas two selected feature vectors or focal points are situated in the spatial zone 104. Using a majority decision, as described above, makes it possible to determine that the position 402 of the object is in the spatial zone 104.

The position of objects can be determined independently of the number of measured values of a feature vector. A measured value of a feature vector usually corresponds to a measured value of a feature of a radio signal from a communication antenna of a vehicle. The independence of the determination of the position from the number of measured values of a feature vector makes it possible to reduce the number of communication antennas in the vehicle in order to reduce costs. Furthermore, the features of the radio signals can be arbitrarily selected. For example, the field strength, the phase angle and/or the direction of the radio signal can be used as features. The position of the objects can therefore be determined independently of the physical features of the radio signals.

The reference data for determining the position can be determined in a completely automated manner on the basis of the determined measured values in order to achieve a predefined success rate when determining a predefined spatial zone for an object relative to a vehicle. There is no need to manually generate reference data and/or manually check the reference data for each vehicle or each vehicle type.

LIST OF REFERENCE SYMBOLS

100 Division of a region into spatial zones
102 Zone 1
104 Zone 2
106 Zone 3
200 Measured value recording
202 Measured value in zone 1
204 Measured value in zone 2
206 Measured value in zone 3
300 Determination of focal points
302 Focal point in zone 1
304 Focal point in zone 2
306 Focal point in zone 3
400 Determination of the position of objects
402 Position of the object
404 Obvious focal points The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating reference data for determining a position of objects relative to a vehicle, the method comprising:
    receiving a respective radio signal transmitted by an antenna of the vehicle at an object for each position of the object from a predefined number of positions of the object in at least two spatial zones of the vehicle;
    determining a respective measured value by the object of the respective radio signal received by the object and transmitted by the antenna of the vehicle for each position of the object;
    transmitting the respective determined measured values by the object to the vehicle at each position of the object;
    determining, by a computer associated with the vehicle, focal points for the determined measured values in each spatial zone of the vehicle, wherein each focal point represents a group of determined measured values in one of the spatial zones of the vehicle;

generating a test set from the determined measured values;

selecting a measured value from the test set;

calculating a position of the selected measured value relative to one or more of the focal points;

determining a first spatial zone belonging to the calculated position of the selected measured value;

verifying the determined first spatial zone of the selected measured value;

updating the success rate for determining the spatial zones; and storing the focal points as the reference data for determining the position of the object in the vehicle if the success rate for determining the spatial zones exceeds the predefined threshold value.

2. The method as claimed in claim 1, wherein each focal point is determined such that a distance between the determined measured values and a focal point is as short as possible.

3. The method as claimed in claim 1, wherein a number of focal points in one of the spatial zones is stipulated on the basis of a predefined success rate for determining the spatial zones.

4. The method as claimed in claim 3, wherein the number of focal points is smaller than the number of determined measured values in one of the spatial zones.

5. The method as claimed in claim 1, wherein the number of focal points is smaller than the number of determined measured values in one of the spatial zones.

6. The method as claimed in claim 1, further comprising:
changing the number of focal points;
calculating the changed number of focal points for the determined measured values in each predefined spatial zone of the vehicle;
selecting a measured value from the test set;
calculating a position of the selected measured value relative to one or more stored focal points;
determining a second spatial zone belonging to the calculated position of the selected measured value;
verifying the determined second spatial zone of the selected measured value;
updating the success rate for determining the predefined spatial zones if the success rate for determining the predefined spatial zones undershoots a predefined threshold value.

7. The method as claimed in claim 1, wherein the determined measured values are subjected to preprocessing before the focal points are determined, and the preprocessing filters physical effects of the radio signal.

8. The method as claimed in claim 1, wherein the determined measured values are given a higher weighting in a border region between at least two spatial zones than the determined measured values outside the border region.

9. The method as claimed in claim 1, further comprising: linking the spatial zones to the determined respective measured values.

10. The method as claimed in claim 1, further comprising: storing the determined respective measured values by the object.

11. A system for generating reference data for determining a position of objects relative to a vehicle, wherein the system is configured to carry out the method as claimed in claim 1.

12. A method for generating reference data for determining a position of objects relative to a vehicle, the method comprising:
receiving a respective radio signal transmitted by an antenna of the vehicle at an object for each position of the object from a predefined number of positions of the object in at least two spatial zones of the vehicle;
determining a respective measured value by the object of the respective radio signal received by the object and transmitted by the antenna of the vehicle for each position of the object;
transmitting the respective determined measured values by the object to the vehicle at each position of the object;
determining, by a computer associated with the vehicle, focal points for the determined measured values in each spatial zone of the vehicle, wherein each focal point represents a group of determined measured values in one of the spatial zones of the vehicle; and
storing the focal points as the reference data for determining the position of the object in the vehicle, wherein the determined measured values are given a higher weighting in a border region between at least two spatial zones than the determined measured values outside the border region.

* * * * *